United States Patent Office 3,096,324
Patented July 2, 1963

3,096,324
PROCESS FOR MANUFACTURING SUGAR ESTERS
Rex H. Goins and Herman E. Davis, Kingsport, Tenn., assignors to Eastman Kodak Company, Rochester, N.Y., a corporation of New Jersey
No Drawing. Filed Aug. 24, 1960, Ser. No. 51,519
8 Claims. (Cl. 260—234)

This invention relates to a method of esterifying sugars which features barium salts of organic acids as the esterification catalyst and the isolation of the esters from their esterification mixtures.

Sugar esters have previously been prepared by reacting on a sugar with a lower fatty acid anhydride containing alkali metal salts of the corresponding lower fatty acid. The sugar ester thus prepared has then been isolated from the reaction mass and refined by one of several slow, inefficient processes. For example, according to one process, the excess anhydride and acid was removed from the reaction mass by washing with several volumes of water, or preferably, by distillation. A solvent such as benzene or toluene was added to reduce the viscosity and the catalyst salt which precipitates is removed by filtration. Residual acidity was removed from the sugar ester solution by washing with a liquid such as sodium carbonate solution. The sugar ester was then concentrated by crystallization or by distallation to remove the solvent. A better quality product was obtained by further treatment with activated charcoal and crystallization from solvent. Appreciable quantities of product were lost in the washing, neutralization and crystallization steps. Moreover, notwithstanding the elaborate isolation and refining procedures, the product thereby prepared was frequently unsuitable for many purposes due to poor color and poor heat stability.

One object of our invention is to provide a method of preparing sugar esters which have higher heat stability and less color than sugar esters prepared in accordance with previous methods. Another object of our invention is to provide a method of isolating sugar esters from the esterification reaction mass in which neutralization, washing, decoloration or crystallization is not required. A further object of our invention is to provide a method of preparing sugar esters which features the use of barium salts of organic acids as the esterification catalyst. A still further object of our invention is to provide a method of isolating sugar esters from the esterification reaction mass which involves the use of centrifugal molecular distillation. Other objects of our invention will appear herein.

We have found that the reaction on a sugar with a lower fatty acid anhydride, or a mixture of lower fatty acid anhydrides, containing a barium salt of an organic acid as the esterification catalyst, and a refining procedure which involves the use of centrifugal molecular distillation, eliminates many of the disadvantages previously encountered in the preparation of sugar esters. The sugar esters prepared in accordance with our invention may be refined quickly and economically without large losses of product. The sugar esters prepared in accordance with our invention have better heat stability and color than sugar esters prepared by previous methods.

Sugar esters in accordance with our invention are prepared by reacting on a sugar with a lower fatty acid anhydride containing barium salt of a weak organic acid as the esterification catalyst. Preferably, the anion of the barium salt corresponds to the anhydride being used. Mixed esters may be obtained by employing a mixture of lower fatty acid anhydrides. An excess of the said acid anhydride or anhydrides may be used over the amount required to esterify the sugar, and barium hydroxide may be added thereto to form the barium salt of the organic acid or acids. We prefer to use 20 to 40% excess of the acid anhydride or anhydrides and 0.5 to 2.0% barium hydroxide pentahydrate or octahydrate, based on the sugar. However, the amount of acid anhydride or anhydrides may be varied considerably, and larger amounts of catalyst may be used. The reaction temperature is maintained at about 120 to 140° C. The rate of reaction may be controlled by feeding one reactant into the other; preferably, the sugar is added to the acid anhydride or anhydrides containing the barium salt catalyst. The reaction is complete in about 3 to 6 hours, the time depending on the amount of catalyst, the temperature of the reaction and the quantity of excess anhydride present.

We have found that it is convenient to isolate and refine the sugar ester from the reaction mixture by the combination of the steps of vacuum distillation, steam distillation, filtration and centrifugal molecular distillation. Vacuum distillation at a temperature not exceeding 150° C. serves to remove excess anhydride and acid from the reaction mixture. The distillation may be continued until the acidity is 2.0% or less, and the residual acidity may then be lowered such as to an acid number less than 0.20 by feeding steam into the material below the liquid level while it is maintained at 140° C. Any moisture present after the steam stripping may be removed by vacuum and heat. The product may then be filtered, preferably at 100° C., to remove precipitated catalyst salts. The filtrate may then be distilled in a centrifugal molecular still at an absolute pressure of 0.05 mm. or less. Commercial centrifugal molecular stills satisfactory for this purpose are described in an article by Hickman, Ind. Eng. Chem., 39, 686 (1947).

The sugars which may be esterified in accordance with our invention include sucrose, glucose, sorbitol, mannose, fructose, lactose, mannitol and, generally, all the sugars the lower fatty acid esters of which are stable to distillation at pressures as low as 0.001 mm. The reaction conditions described above are particularly suitable for the preparation of sucrose octaisobutyrates or of sucrose acetate isobutyrates having varying isobutyryl and acetyl contents.

Sugar esters have varied uses. For example, sucrose acetate isobutyrate is useful in coatings and as a plasticizer or extender.

The following examples will illustrate the preparation of sugar esters in accordance with our invention:

*Example 1*

200 grams of sucrose (0.585 gram mole), 872 grams of isobutyric anhydride (5.5 gram mole), 80 grams of acetic anhydride (0.784 gram mole) and 2.2 grams of barium hydroxide pentahydrate were charged into an agitated reaction flask and heated to a temperature of 120° C. The reaction was maintained at 120–130° C. for 5 hours until a clear solution was obtained indicating complete reaction. The excess anhydride and acids formed in the reaction were removed by vacuum distillation until the pot liquid temperature reached 120° C. at 20 mm. absolute pressure. Residual acidity (1–2% calculated as isobutyric) was then removed by feeding steam under the surface of the residue product while maintaining the pot liquid temperature at 120–150° C. The steam distillation was continued until the acid number was reduced to 0.20 which corresponded to an acidity of 0.03% calculated as isobutyric. Moisture remaining from the steam distillation was removed by vacuum distillation. The dry residue product was filtered at 100° C. to remove catalyst salts. The filtrate was then distilled on a 5-inch centrifugal molecular still in which 446 grams of product were obtained corresponding to 90% of theoretical. The distillation was accomplished at 160–180° C. and 0.01–0.02 mm. absolute pressure.

Analytical data obtained on the distillate is given below:

Original color, APHA _____ 40
Percent acidity as isobutyric acid _____ 0.01
Heat test color after heating 2 hours at 230° C.
Gardner scale _____ 3
Saponification equivalent _____ 105.9

*Example 2*

Example 1 was duplicated except that 2.2 grams of sodium hydroxide were used to form the catalyst rather than the barium hydroxide pentahydrate. The product was nearly black after the acid stripping step while the barium salt catalyzed material at the same point in the preceding example had a color of 200 APHA. The results were otherwise similar to those obtained in Example 1.

*Example 3*

This example was carried out on a somewhat larger scale utilizing plant equipment. 1,444 gallons of isobutyric anhydride, 146 gallons of acetic anhydride and 30 pounds of barium hydroxide pentahydrate were charged into an agitated reaction vessel and heated to a temperature of 120° C. 2,700 pounds of powdered sucrose were added over a period of five hours while controlling the temperature at about 124° C. The temperature of the reaction was increased to 130° C. and maintained for three hours to assure complete reaction. The reacted product containing anhydride, acid from the reaction and catalyst was transferred into a conventional vacuum still. The major portion of the anhydrides and acids were removed by gradually applying vacuum and heat to 10–20 mm. (absolute) pressure and a base heater liquid temperature of 135° C. The residual acidity of about 1% calculated as isobutyric remaining in the concentrated product was removed by steam distillation. The steam distillation was accomplished by feeding water into the base heater in which the liquid temperature was maintained at 100–135° C. and the vacuum at 100 mm. or less. The acidity of the product was reduced to an acid number of 0.20 or less. Any moisture from the steam distillation was removed by vacuum and heat thereby precipitating the catalyst salt. The product was filtered through a plate and frame press while hot to remove the precipitated catalyst. It was then distilled in a five foot centrifugal molecular still at a rate of 90–100 gallons per hour. The distillation was accomplished at an absolute pressure of 0.01–0.03 mm. and a temperature of 180–190° C. Analytical properties of the distilled product are given below:

Color, APHA _____ 50
Percent acidity as isobutyric _____ .02
Heat test color after heating 2 hours at 230° C.
Gardner scale _____ 4
Saponification equivalent _____ 105.5

Prior to distillation an original color of 200 APHA and a heat test color of 12 (Gardner scale) was observed.

The APHA color is determined by first preparing a suitable platinum-cobalt color standard according to the American Public Health Association's "Standard Methods for the Examination of Water and Sewage," 8th Edition (1936). 100 ml. of the sample is transferred to one of two tall-form Nessler tubes, and the second tube is filled to the mark with the platinum-cobalt standard representing the maximum limit permitted by the specification. The colors of the sample and the standard are compared by viewing vertically down through the tubes against a white background. If the exact color of the sample is desired, replace the standard tube with other standards until a satisfactory match is obtained.

The Gardner scale is a well known standard for determining color values.

The method of preparing sugar esters in accordance with our invention would be adaptable to a continuous process since there are no steps which would require batch operations, such as washing or neutralization.

We claim:

1. The method of preparing sugar esters which comprises reacting a sugar selected from the group consisting of the mono- and di-saccharides with a reaction mixture containing a lower fatty acid anhydride and a barium salt of an organic acid as the catalyst.

2. The method of preparing sugar esters which comprises reacting a sugar selected from the group consisting of the mono- and di-saccharides with a reaction mixture containing lower fatty acid anhydrides and a barium salt of an organic acid as the catalyst.

3. The method of preparing sugar esters in accordance with claim 1 where the anion of the barium salt corresponds with an anhydride being used.

4. The method of preparing sugar esters which comprises reacting a sugar selected from the group consisting of the mono- and di-saccharides with a lower fatty acid anhydride, in excess of the amount required to esterify the sugar, to which has been added about 1% barium hydroxide, based on the weight of the sugar.

5. The method of preparing mixed esters of sugar which comprises reacting a sugar selected from the group consisting of the mono- and di-saccharides with a mixture of lower fatty acid anhydrides, in excess of the amount required to esterify the sugar, to which has been added about 1% barium hydroxide, based on the weight of the sugar.

6. The method of preparing sugar esters according to claim 4 where the sugar is sucrose.

7. The method of preparing sucrose acetate isobutyrate which comprises reacting sucrose with a mixture of acetic anhydride and isobutyric anhydride, in excess of the amount required to esterify the sucrose, to which has been added about 1% barium hydroxide, based on the weight of the sugar.

8. A method of preparing sugar esters according to claim 1 wherein the sugar ester so prepared is isolated from the reaction mass by (1) removal of excess anhydride and acid by vacuum distillation, (2) steam distillation to reduce the residual acidity to an acid number less than 0.20, (3) filtration of the crude product to remove the barium salts therefrom and (4) centrifugal molecular distillation of the filtrate to give a distilled sugar ester.

References Cited in the file of this patent

UNITED STATES PATENTS

| | | |
|---|---|---|
| 2,518,135 | Gaver | Aug. 8, 1950 |
| 2,868,781 | Gaertner et al. | Jan. 13, 1959 |
| 2,893,990 | Hass et al. | July 7, 1959 |
| 2,931,802 | Touey et al. | Apr. 5, 1960 |